Feb. 9, 1965   J. B. GATZEMEYER ETAL   3,168,810
TWO SHAFT GAS TURBINE CONTROL SYSTEM
Filed Aug. 29, 1962   2 Sheets-Sheet 2
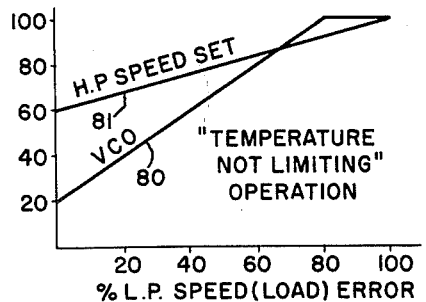
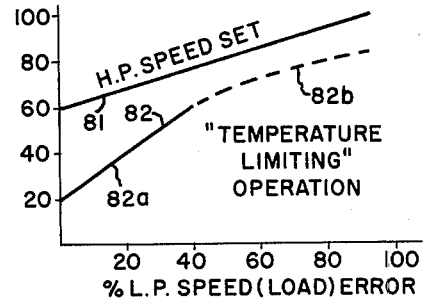
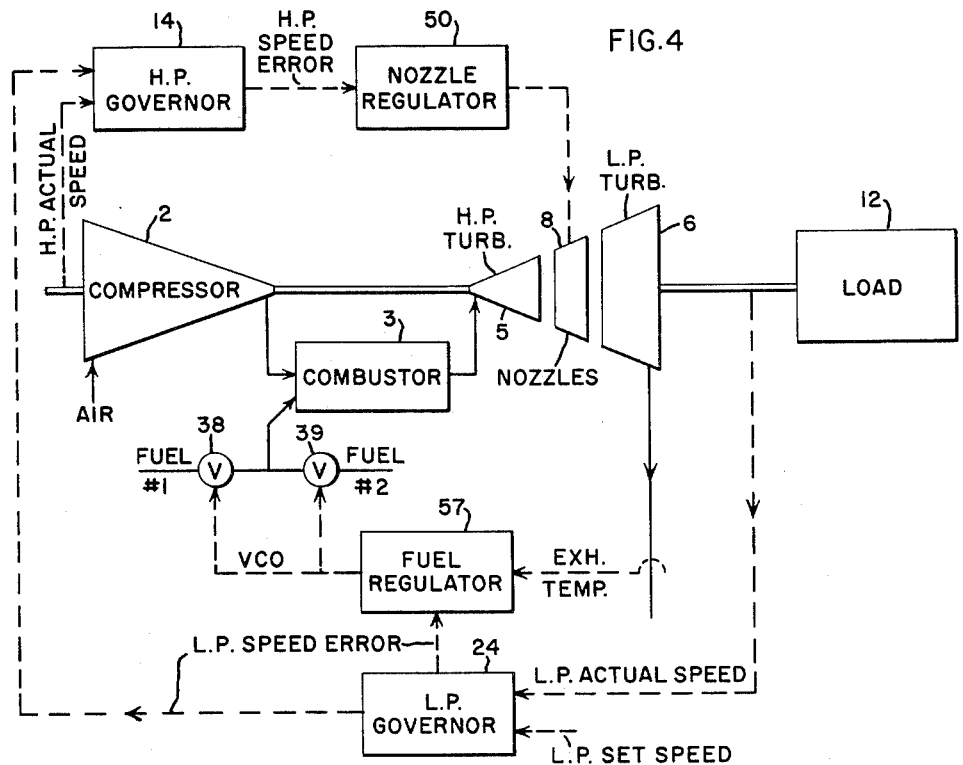
INVENTORS:
JACOB B. GATZEMEYER,
NEAL E. STARKEY,
BY *W. C. Crutcher*
THEIR ATTORNEY.

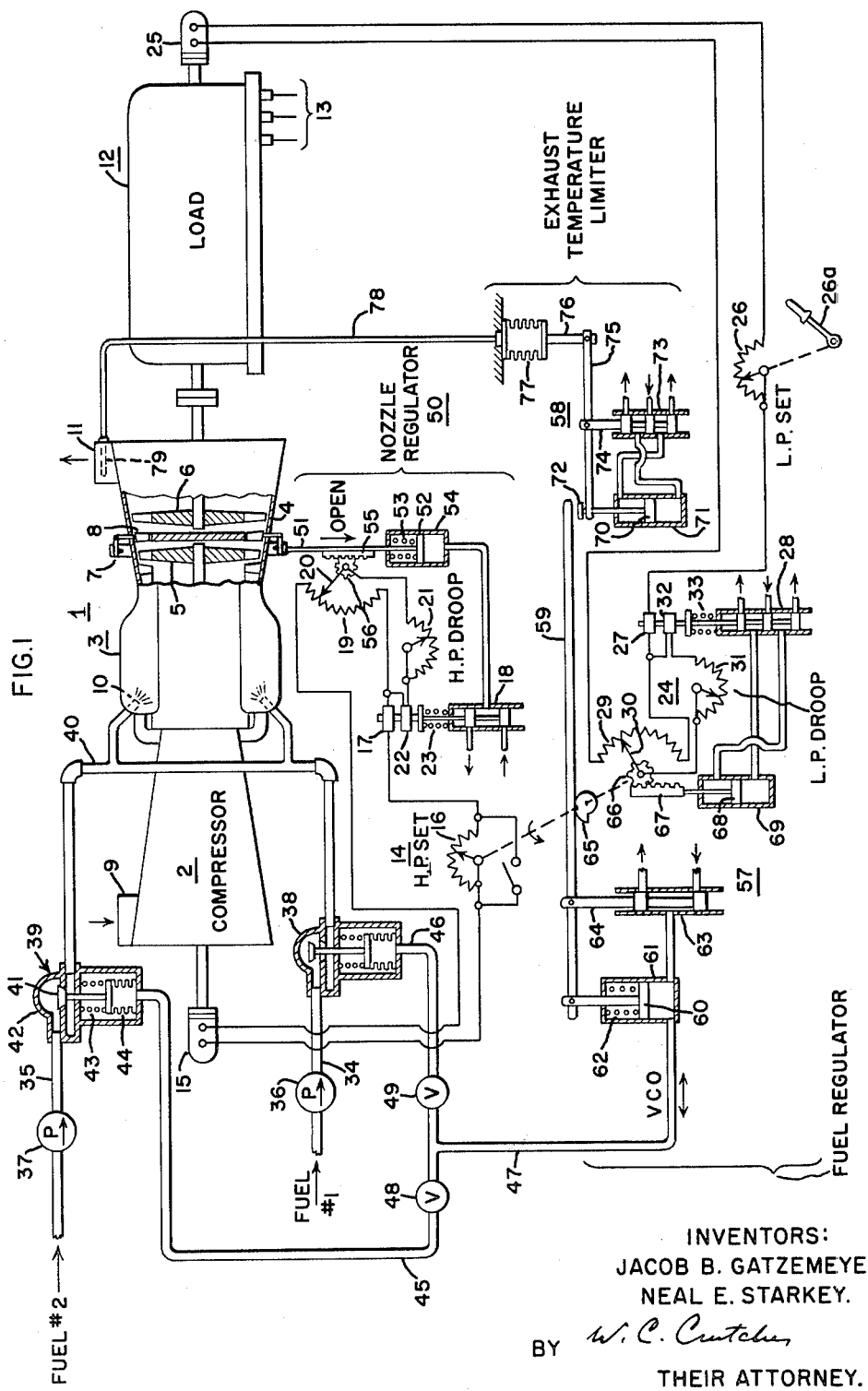

United States Patent Office
3,168,810
Patented Feb. 9, 1965

3,168,810
TWO SHAFT GAS TURBINE CONTROL SYSTEM
Jacob B. Gratzemeyer and Neal E. Starkey, Schenectady, N.Y., assignors to General Electric Company, a corporation of New York
Filed Aug. 29, 1962, Ser. No. 220,179
12 Claims. (Cl. 60—39.16)

This invention relates to gas turbine control systems, and particularly to an improved regulating system for controlling a variable turbine nozzle in a gas turbine power plant of the type having a turbine-compressor unit and a second turbine rotor mechanically independent of the turbine-compressor rotor for delivering the useful power output, with a variable angle nozzle interposed between the compressor turbine and the load output turbine.

Gas turbine designers have previously noted that the flexibility of operation of the gas turbine power plant is greatly improved if the turbine-compressor unit is divorced from the load output turbine unit, so that the speed of the compressor supplying air to the combustion system is independent of the speed desired for the power output shaft. Thus, the compressor can be operated at a speed at which it is most efficient, while the speed of the load output turbine can vary as required by the nature of the power-consuming device to which it is connected. It is further found desirable to be able to vary the effective area and discharge angle of the nozzles supplying motive fluid to the load output turbine rotor, and to this end various means for adjusting a turbine nozzle have been proposed.

The maximum operating temperatures, and hence, highest efficiency, at which gas turbines can operate is limited by the strength of the available materials at these elevated temperatures. It has been noted that the highest possible efficiency can be maintained over a wide variety of operating conditions by using means responsive to the turbine exhaust temperature to control one or more operating conditions of the gas turbine power plant so as to hold the turbine exhaust temperature substantially constant despite other, sometimes conflicting, requirements on the power plant.

One such arrangement is disclosed in U.S. Patent 2,625,789 issued to N. E. Starkey on January 20, 1953, and assigned to the assignee of the present application. In that patent, the exhaust temperature of the gas turbine serves to control the speed setting of the turbine-compressor rotor, while the speed or load of the load turbine rotor is measured and used to control the fuel flow.

Another similar arrangement is disclosed in U.S. Patent 2,912,824 issued to F. H. Van Nest et al. on November 17, 1959 and also assigned to the present assignee. In that patent the exhaust temperature controls the fuel flow while the speed of the turbine-compressor rotor is held substantially constant by use of the variable nozzle.

Although the regulating systems in the aforementioned patents are capable of successfully providing integrated control over units with mechanically independent compressor-turbine and load-turbine rotors, there are certain inherent disadvantages in those arrangements which are overcome by the present invention. One disadvantage is the time lag involved in the exhaust temperature control before exhaust temperature will respond to new speed or load requirements of the load-turbine rotor. Another disadvantage is the turbines designed to use two or more different fuels, where the fuel heating values or the fuel flow characteristics of the devices admitting fuel are not the same, thereby giving different rates of heat release for the same fuel demand signal. In other words, changeover from one fuel to another while the turbine was carrying load would often bring about changes in load or new turbine operating characteristics.

Accordingly, one object of the present invention is to provide an improved regulating system for the fuel supply and for the variable nozzle in a gas turbine power plant of the type described.

Another object of the invention is to provide an improved regulating system for a two shaft gas turbine which is responsive to turbine exhaust temperature so as to obtain high operating efficiencies, while at the same time is quickly responsive to new operating requirements.

Another object of the invention is to provide an improved control system for a two-shaft gas turbine designed to operate on more than one fuel, which will hold the load constant during transfers from one fuel to the other.

Still another object of the invention is to provide an improved regulating system for a two-shaft gas turbine which will maintain the load output shaft speed constant at a preselected value while also limiting the turbine exhaust temperature to a maximum preselected value, while at the same time adjusting the desired speed of the compressor-turbine rotor to correspond to new operating conditions without substantial time lag.

The organization and operation of the invention, together with further objects and advantages thereof, may best be understood by reference to the following description taken in connection with the accompanying drawings in which:

FIG. 1 is a diagrammatic representation of a two-shaft gas turbine power plant having a control system in accordance with the invention, FIG. 2 is a graph illustrating the operation of the control system when exhaust temperature is not limiting, FIG. 3 is a graph illustrating the operation of the system when exhaust temperature is limiting, and FIG. 4 is a simplified schematic representation of the turbine and its control system, shown in block diagram form.

Briefly stated, the invention is practiced by employing a governor for the load turbine rotor with a speed droop characteristic, wherein the deviation from set speed is used to control fuel flow to the gas turbine combustors and also simultaneously vary the speed setting of a separate governor for the compressor-turbine rotor shaft, the latter also having a speed droop characteristic. The fuel flow is limited by a pre-selected maximum turbine exhaust temperature, whereas, the set speed of the compressor-turbine rotor is not affected by the exhaust temperature but remains under the control of the load turbine rotor governor. Variations in load or speed are communicated to both control devices (fuel regulator and compressor rotor speed regulator) with very little time lag. When the turbine power plant is "temperature limited," i.e. fuel flow limited by turbine exhaust temperature, the air flow will be substantially proportional to the load on the output turbine, and changes from one fuel to another may be effected readily, without disturbance in output shaft speed or load.

*Prime mover*

Referring now to FIGURE 1 of the drawing, a two-shaft gas turbine power plant shown generally as 1, includes a compressor 2, which may be of the multi-stage axial flow type, a combustion system 3, and a common turbine casing 4 enclosing a high pressure turbine rotor 5 and a low pressure turbine rotor 6. A variable angle turbine nozzle adjusting ring 7 serves to adjust the effective blade angles of nozzles 8, to control the pressure relationships across the blades on turbine rotors 5, 6. Rotating nozzle ring 7, to decrease the effective blade angle of nozzles 8, i.e. to open the variable nozzle, will cause the speed of high pressure rotor 5 to increase and that of low pressure rotor 6 to decrease.

Air enters the compressor 2 through inlet 9, and is mixed with fuel injected through nozzles 10 into combustors 3 where combustion takes place. After passing through turbine casing 4, the motive fluid exits through the exhaust hood outlet 11.

The gas turbine 1 is coupled to drive a load, shown here as an electrical generator 12 which is connected to supply power to an external electrical system through leads 13. It will be understood that the function of turbine rotor 5 is to drive compressor 2, to supply air to the combustion system, and it is known as the compressor-turbine rotor or high pressure (HP) rotor. The turbine rotor 6 serves to drive load 12, and it is known as the load output turbine rotor or low pressure (LP) rotor.

HP and LP governors

There are two speed governors, one for the turbine-compressor or HP rotor and one for the load-turbine or LP rotor. These are substantially identical in the embodiment shown. However, they can be either mechanical or of the electrical type. The HP governor, shown generally at 14, comprises a tachometer generator 15 attached to the HP shaft and supplying a voltage proportional to the speed of turbine rotor 5. An HP speed setting rheostat 16 provides for adjustment of the current flowing through a solenoid control coil 17 wound to exert downward force on the stem of a hydraulic pilot valve 18. The current produced by tachometer generator 15 also flows through a stabilizing rheostat 19, with a movable arm 20. A portion of the voltage drop across the stabilizing rheostat 19 causes current to flow through a parallel-connected HP droop-adjusting rheostat 21 and a stabilizing solenoid coil 22, wound to add to the force produced by control coil 17. A spring 23 serves to bias the stem of pilot valve 18 upwardly against the force produced by current passing through control coil 17 and stabilizing coil 22.

The components of the load turbine or LP governor, shown generally as 24, are similar in construction and operation to those of the HP governor 14. They are designated in succession as a tachometer generator 25, an LP speed setting rheostat 26, a control coil 27, a pilot valve 28, a stabilizing rheostat 29, a movable arm 30, an LP droop-adjusting rheostat 31, a stabilizing coil 32, and a spring 33. LP speed setting rheostat 26 has a handle 26a which is used to exercise control of speed or load on the output rotor as will be explained.

It will be understood by those familiar with regulating systems of this general type, that what are shown diagrammatically in FIGURE 1 as direct current generators 15, 25 will ordinarily be small 3-phase alternators in combination with 3-phase full wave rectifiers for producing voltages proportional to the speeds of the respective rotors.

It will also be understood that control coils 17, 27 produce a downward force opposing the bias of springs 23, 33, respectively, which force increases with increased current flowing through control coils 17, 27. Assuming that the pilot valves 18, 28 serve to operate hydraulic servomechanisms causing movements of movable arms 20, 30, it will be appreciated that these movements affect the current flowing through stabilizing coils 22, 32, respectively, the winding sense of these coils being such as to add to ampere turns produced in the control coils.

The foregoing types of electric governors 14, 24 will have a speed-droop characteristic, i.e. movable arms 20, 30 will assume a position that is proportional to an error between actual speed sensed by tachometer generators 15, 25 and the set speed requested by rheostats 16, 26. This is due to the feedback action of stabilizing coils 22, 32, which adds to corrective action being undertaken at the same time by control coils 17, 27.

Fuel system

The turbine shown is arranged to be operated on two different fuels, these being supplied through conduits 34, 35 by pumps 36, 37. The details of the two fuel systems are shown to be identical in the drawing, although it will be understood that their details might vary considerably, for example, if one fuel were liquid such as "Bunker C" oil and the other were gaseous such as natural gas. Fuel from line 34 is controlled as to its flow by a hydraulically actuated valve 38, while fuel from line 35 is controlled by a valve 39. The fuels feed a common manifold 40, which supplies fuel nozzles 10.

Only the valve 39, will be described in detail, it being typical of a suitable valve controlled by a hydraulic signal. The valve disk 41 is adapted to control the flow through a casing 42. The disk 41 is biased to a closed position by a spring 43, and is biased toward an open position by hydraulic pressure in a sealed bellows chambers 44. The variable control oil (VCO) pressure is an "output signal pressure" which varies in response to the requirements of the fuel regulator and raises or lowers valve disk 41 to adjust the supply of fuel to nozzles 10. Dual VCO lines 45, 46, are shown supplying pressure signals to valves 39, 38, respectively, and are connected to a common VCO line 47. Valves 48, 49, may be used to shut off the VCO signal to one of the valves and to admit the VCO signal to the other valve so as to shift from one fuel to another. In some cases, valves 48, 49, may be controlled automatically so as to admit fuels singly or together in desired proportions according to a predetermined schedule, as more particularly disclosed in U.S. Patent 2,933,894, issued to R. M. Johnson and A. Loft on April 26, 1960, and assigned to the assignee of the present application.

It will be understood that in lieu of a combustion heating system wherein the heat added to the motive fluid is a function of fuel supplied, other types of gas turbines, especially closed cycles may use other means of adding heat to the motive fluid, for instance through the use of heat exchangers. Control of heat added to the motive fluid in the latter case is analogous to control of the fuel added to the open-cycle combustion gas turbine depicted. Thus it will be understood that valves 38, 42 represent broadly means for determining the rate of heat input to the working fluid.

Nozzle regulator

The nozzle regulator, shown generally as 50, is a hydraulic servomechanism under the primary control of the HP governor 14, and which serves to set the opening of nozzles 8. The construction of the variable nozzles 8, may be similar to those described in U.S. Patent 2,919,890, issued to A. N. Smith, et al., on January 5, 1960, and assigned to the assignee of the present application. The nozzle control ring 7 is rotated by an attached rod 51 operated by a piston 52. Piston 52 is biased downward toward nozzle "open" position by a spring 53 in a hydraulic cylinder 54. Admission of hydraulic fluid to cylinder 54, is controlled by the pilot valve 18 connected to a source of hydraulic fluid under pressure (not shown). Attached to rod 51 is a rack 55, whose movement rotates a gear 56, and attached arm 20 of stabilizing rheostat 19.

The nozzle regulator 50, acting together with HP governor 14, operates in the following manner. When the number of ampere turns in control coil 17 is reduced, either due to a decrease in the speed of tachometer generator 15, or due to an increased speed setting (clockwise rotation of HP speed setting rheostat 16), spring 23 will cause the stem of pilot valve 18, to move upward, releasing fluid from cylinder 54, causing piston 52, to move downward and move the nozzles 8 to a more wide open position. Downward movement of piston 51, will rotate stabilizing rheostat arm 20 clockwise, and thereby increase current through stabilizing coil 22. At the same time, the opening nozzles will increase the pressure drop across turbine rotor 5 and cause its speed to increase, which also increases the current output from generator 15 through control coil 17. This will return pilot valve 18 to its neutral position and prevent the nozzles 8 from opening further. The force created by control coil 17 adds to the upward force due to the action of stabilizing coil 22. This means that, although the pilot valve 18 has returned to its original position, the nozzles have assumed a new position. It should be noted that the current flowing through stabilizing coil 22 (proportional to the position of rheostat arm 20) represents an error between set speed and actual speed. Different settings of HP speed setting rheostat 16 will, therefore, provide different nozzle angle settings. The HP governor 14 and nozzle regulator 50 will thus have a drooping characteristic, i.e., there will be a decrease or droop in high pressure turbine speed from the set speed. The amount of speed droop between open and closed nozzle positions is adjusted with HP droop rheostat 21.

Fuel regulator

The fuel regulator, shown generally at 57, is arranged to provide a varying VCO signal pressure to the common VCO conduit 47, in response to commands from the LP governor 24, and/or from the exhaust temperature limiter, shown generally as 58.

Fuel regulator 57, includes a floating lever 59, the left-hand end of which is pivoted to the stem of a VCO piston 60, disposed in VCO cylinder 61, and biased downward by means of a spring 62. Since the force of spring 62 is always balanced by the pressure below piston 60, the pressure in VCO cylinder 61, is a unique function of the position of piston 60.

The flow of hydraulic fluid to and from cylinder 61, is controlled by a VCO pilot valve 63, whose stem 64, is also pivotally attached to lever 59. VCO pilot valve 63, is supplied by a source of hydraulic fluid under pressure (not shown). When the right-hand end of rod 59 is depressed, lever 59 will first pivot clockwise about the connection on the stem of piston 60, to move pilot valve stem 64 so as to admit fluid to cylinder 61. This will cause piston 60, to rise and re-center the pilot valve 63. Therefore, the lever 59, can be considered as pivoting about stem 64, of the pilot valve, a clockwise movement giving increased VCO pressure and a counterclockwise movement giving decreased VCO pressure.

One means to raise and lower the right-hand end of lever 59, is a cam 65, which is rotated by a gear 66, upon up or down movement of a rack 67. Rack 67 is connected to a piston 68 disposed in a cylinder 69. The flow of hydraulic fluid to and from cylinder 69, is controlled by the previously mentioned LP governor pilot valve 28, connected to a source of hydraulic fluid under pressure (not shown).

The LP governor 24, together with fuel regulator 57, provides a VCO signal pressure responsive to changes in speed of the LP turbine rotor 6. LP governor 24 has a drooping speed characteristic similar to the aforementioned high pressure governor and nozzle regulator 50. The current flowing through stabilizing coil 32, which is proportional to the position taken by cam 65, is also proportional to the difference between the LP turbine speed setting, as set on rheostat 26, and the actual LP turbine speed, as sensed by tachometer generator 25. This difference between actual and set speeds is designated the "speed error." The amount of speed droop for a full rotation of cam 65 may be adjusted with the LP droop rheostat 31.

Cam 65 serves to raise or lower the right-hand end of lever 59, to adjust the VCO signal pressure in line 47, a counterlockwise rotation of the cam serving to lower the right end of lever 59 and increase the VCO pressure. Thus the fuel supply will be regulated in accordance with the position assumed by cam 65, in response to the speed error of the LP turbine, provided that the lever 59, is not affected by other overriding movements.

It will be understood by those familiar with the operation of turbines controlled by governors with speed-droop characteristics, that operation is slightly different depending upon whether the turbine is operating independently or whether it is driving a load which is mechanically or electrically connected to other turbine-driven loads. In the first case, its speed will decrease or "droop" as load is applied. In the latter case, since its speed is held constant by the other turbines, its droop or tendency to slow down as load is applied will be a measure of the degree to which it will share the total load with the other turbines. In other words, movement of lever 26a in FIG. 1 will serve to set desired speed if the turbine is operating independently or desired load if it is operating as part of a system. Hence the aforementioned difference between set speed and actual speed, i.e. "speed error" would correspond to a load condition of the output turbine if it were operating as part of an interconnected system.

Exhaust temperature limiter

Clockwise rotation of lever 59 (increase in VCO pressure) is limited by the exhaust temperature limiter 58. This comprises a piston 70 housed in a cylinder 71, and having a stop member 72 attached to its stem which, when elevated, will prevent downward movement of the right-hand end of lever 59. The flow of hydraulic fluid to and from cylinder 71 from a source of pressure (not shown), is controlled by a pilot valve 73. The stem 74, of the pilot valve is attached to a floating lever 75, which is also pivotally attached to the stem of piston 70. The input movement to floating lever 75 is provided by rod 76 attached thereto in response to the pressure in a bellows 77. A conduit 78, connects the bellows with a temperature responsive device 79, disposed in exhaust passage 11. Device 79 may be a suitable fluid-filled bulb (which may contain argon, nitrogen, or other suitable gas) and when the gas expands, due to increased temperature, expansion of bellows 77 causes rod 76 to move downward. This will admit fluid through pilot valve 73, to the lower end of cylinder 71 and raise stop 72, to prevent the VCO pressure from increasing by limiting clockwise rotation of lever 59 and hence, to restrict the supply of fuel to the turbine.

It will be noted that when the fuel regulator 57 is thus "temperature-limited," the cam 65, will nevertheless, continue to assume various positions in response to the speed error on the load turbine, even though these movements are ineffective in changing the VCO pressure.

In accordance with one important feature of the invention, the connected gear 66 and cam 65 are also connected to operate the HP speed setting rheostat 16. In other words, LP shaft speed errors sensed by governor 24, are immediately translated to new settings for the HP governor 14, this being true whether or not the turbine is operating "temperature-limited."

It will also be noted that the HP speed set rheostat 16 will necessarily give a certain HP speed setting for each position taken by cam 65, which will also correspond to a VCO pressure which the same cam position will produce if the fuel regulator 57 is not limited by the exhaust temperature limiter 58.

"Temperature not limited" operation

The aforementioned correspondence between the setting on HP rheostat 16, and VCO pressure in line 47 which will exist if the regulator is not "temperature-limited" may be represented by FIG. 2 of the drawing. There the horizontal axis represents percent LP speed error, while the vertical axis is also expressed in percent. The system may be adjusted so that the VCO pressure (fuel flow) increases at a certain rate to its maximum at 80% speed error and then continues constant at 100% fuel flow as indicated by line 80, on the graph. The slope of line 80 can be adjusted with LP droop rheostat 31.

Line 81, represents a proportional increase of high pressure speed setting with each increase in LP speed error. Its slope and origin can be changed by adjustment of the HP droop rheostat 21 and the incremental resistance of HP speed setting rheostat 16.

FIGURE 2 represents only one preselected schedule between HP speed setting and VCO setting, many others being possible according to the application desired. It will be apparent that the relationships between VCO line 80 (representing fuel flow) and HP set line 81 (representing air flow) can be selected to give the best operating relationship when the temperature in the exhaust is not limiting the rate of fuel supply. FIG. 2 will generally be applicable during startup of the turbine and before load is applied.

"Temperature limiting" operation

For operation after load is applied, and the highest efficiency is sought, FIG. 3 indicates the general operating condition of the turbine. There the line 81, representing setting of the HP rheostat 16, is the same as shown previously. The second line 82 represents VCO pressure or fuel flow. It wil be noted that the initial portion of line 82, designated 82a, corresponds exactly with the initial portion of line 80 of FIG. 2. However, on the dotted portion of line 82, designated 82b, the cam rotation itself no longer controls the VCO pressure. Instead, VCO pressure follows a curve determined by the exhaust temperature. It will not be exactly flat since other variables of the power plant affect the exhaust temperature at greater loads.

Operation and advantages

A better understanding of the operation of the invention may be had by reference to FIG. 4, which is a block diagram, wherein the major elements of the power plant and control system are designated with the same reference numerals as in FIG. 1. It will be seen that the operation of the gas turbine is basically controlled by adjustment of nozzle regulator 50, and fuel regulator 57.

The LP governor 24, is furnished with the actual LP speed and the set LP speed as inputs. The set speed (which might also be a desired load) is introduced by the operator with handle 25a (FIG. 1). The LP governor output is an LP speed error signal (proportional to the position of cam 65). This LP speed error signal serves as one input to fuel regulator 57, while the turbine exhaust temperature serves as the second input. The LP speed error controls the supply of fuel unless the supply of fuel is limited by the exhaust temperature, as previously described. The output from fuel regulator 57 is a varying VCO pressure which controls valves 38, 39, either separately or in accordance with a predetermined schedule for utilizing two fuels simultaneously. The LP speed error signal from LP governor 24, also directly adjusts the speed setting for HP governor 14, where it is compared with the actual HP turbine speed to produce an HP speed error (proportional to the position of gear 56 of the nozzle regulator). The HP speed error controls the nozzle opening by the nozzle regulator 50. It will be noted that the LP speed error signal simultaneously adjusts the HP speed setting and the VCO pressure (the latter adjustment being ineffective if the power plant is "temperature-limited."

When the temperature is not limited (FIG. 2), the compressor-turbine speed setting is directly under the control of the speed error signal from LP governor 24, which also sets the desired fuel supply. Therefore, fuel supply increases with air flow according to a predetermined schedule. Variations in speed or load on LP turbine 6 are immediately translated to new fuel and air flow requirements without the time lag associated with some prior art two shaft gas turbine control systems.

When the load turbine 6 is operating at fairly high loads and good efficiency is the primary requisite, exhaust temperature is limited as shown by FIG. 3 of the drawing. There the VCO pressure (fuel supply) is limited as indicated by dotted portion 82b of the curve. Since the exhaust temperature is limited, and since variations in load are immediately translated to an LP speed error by LP governor 24 which, in turn, changes settings on HP governor 14, the compressor-turbine speed will be proportional to load and hence, the air flow through compressor 2, will also be proportional to load (neglecting ambient temperature changes). Variations in load or electrical system frequency changes (if the load 12 happens to be a generator connected to an electrical system) will immediately result in new settings on HP governor 14, and call for increased or decreased air flow to adjust to the new power requirements.

Another important advantage of the invention when the operation is temperature-limited, is that the power plant will hold constant load when changing from one fuel to another. For example, if the fuel flow characteristics of valves 38, 39 are such that the fuels do not provide equivalent heating values for the same VCO pressure, the load will nevertheless remain constant when changing from one fuel to another. This is because exhaust temperature, which controls the fuel supply, is held constant despite a shift in VCO pressure called for by the fuel regulator 57. The load is held constant during the changeover by the changes in settings on HP governor 14. The exhaust temperature control holds temperature constant by controlling fuel and the HP speed is constant since governor output does not change for generator drive at constant frequency. Thus a fixed temperature and a fixed fuel flow mean constant load.

It will be apparent from the above that the time lags of control devices responsive to turbine exhaust temperature are avoided in the present invention, since variations in load are immediately translated into new speed settings for the mechanically independent shaft of the compressor-turbine rotor. Yet the exhaust temperature is held substantially constant to give the highest efficiency without exceeding the desired maximum temperature. Control of the fuel supply may shift back and forth between temperature-limited and non-temperature-limited operation without detrimental effect.

Other modifications of the invention will occur to those skilled in the art, and while there has been described what is at present considered to be the preferred embodiment of the invention, it is, of course, intended to cover in the appended claims all such modifications as fall within the true spirit and scope of the invention.

What we claim as new and desired to secure by Letters Patent of the United States is:

1. In a control system for a gas turbine power plant having a compressor-combustor-turbine unit and a load-turbine unit, the compressor-turbine rotor discharging motive fluid through an adjustable nozzle to the load-turbine rotor, said rotors being mechanically independent, the combination of:

first means responsive to the speed of the compressor-turbine rotor for varying the adjustable nozzle in accordance with a speed setting, and, second means responsive to the speed of the load turbine for regulating the supply of fuel to the combustion system and simultaneously regulating the set speed of said first means.

2. In a control system for a gas turbine power plant having a compressor-combustor-turbine unit and a load-turbine unit, the compressor-turbine rotor discharging motive fluid through an adjustable nozzle to the load-turbine rotor, said rotors being mechanically independent, the combination of:

first means responsive to the speed of the compressor-turbine rotor for varying the adjustable nozzle in accordance with a speed setting, second means responsive to the speed of the load turbine for regulating the supply of fuel to the combustion system and simultaneously regulating the set speed of said first means, and, third means responsive to an exhaust temperature condition for limiting the supply of fuel called for by said second means without affecting the set speed of said first means.

3. In a regulating system for a gas turbine power plant having a compressor-combustor-turbine unit and a load output turbine unit with a rotor mechanically independent of the compressor-turbine rotor, said rotors being in series flow relation with adjustable nozzle means therebetween, the combination of:

first means responsive to the speed of the compressor-turbine rotor for varying the adjustable nozzle in accordance with a speed setting, and, second means responsive to a load condition of the output turbine for regulating the supply of fuel to the combustion system and simultaneously regulating the set speed of said first means.

4. In a regulating system for a gas turbine power plant having a compressor-combustor-turbine unit and a load output turbine unit with a rotor mechanically independent of the compressor-turbine rotor, said rotors being in series flow relation with adjustable nozzle means therebetween, the combination of:

first means responsive to the speed of the compressor-turbine rotor for varying the adjustable nozzle in accordance with a speed setting, second means responsive to a load condition of the output turbine for regulating the supply of fuel to the combustion system and simultaneously regulating the set speed of said first means, and third means responsive to an exhaust temperature condition for limiting the supply of fuel called for by said second means without affecting the set speed of said first means.

5. In a regulating system for a gas turbine powerplant having a compressor-turbine unit, a load output turbine unit, heating means for the motive fluid, and variable area nozzle means connected in series between said units to divide the available energy of the motive fluid between the compressor-turbine rotor and the load output turbine rotor, said rotors being mechanically independent, the combination of:

first means responsive to the speed of the compressor-turbine rotor for controlling said variable nozzle means in accordance with a speed setting of said first means, and, second means responsive to the speed of the load turbine for controlling the addition of heat to the motive fluid by the heating means and simultaneously changing the speed setting of said first means.

6. In a regulating system for a gas turbine powerplant having a compressor-turbine unit, a load output turbine unit, heating means for the motive fluid, and variable area nozzle means connected in series between said units to divide the available energy of the motive fluid between the compressor-turbine rotor and the load output turbine rotor, said rotors being mechanically independent, the combination of:

first means responsive to the speed of the compressor-turbine rotor for controlling said variable nozzle means in accordance with a speed setting on said first means, second means responsive to the speed of the load turbine for controlling the addition of heat to the motive fluid by the heating means and simultaneously changing the speed setting on said first means, and third means, responsive to an exhaust temperature condition of the powerplant for limiting the addition of heat to the motive fluid called for by said second means without affecting the speed setting on said first means.

7. In a regulating system for a gas turbine power plant having a compressor-combustor-turbine unit and a load output turbine unit with a rotor mechanically independent of the compressor-turbine rotor, said rotors being in series flow relation with variable nozzle means therebetween, the combination of:

first governor means responsive to the speed of the compressor-turbine rotor for adjusting said variable nozzle means in accordance with a first speed setting on said first governor means, and second governor means responsive to the speed of the load turbine and having a drooping speed characteristic so as to furnish a speed error output signal which is proportional to the difference between actual load turbine speed and a second speed setting on said second governor means, said speed error output signal serving to adjust the supply of fuel to the combustion system and to simultaneously change the first speed setting on said first governor means.

8. In a regulating system for a gas turbine power plant having a compressor-combustor-turbine unit and a load output turbine unit with a rotor mechanically independent of the compressor-turbine rotor, said rotors being in series flow relation with variable nozzle means therebetween, the combination of:

first governor means responsive to the speed of the compressor-turbine rotor for adjusting said variable nozzle means in accordance with a first speed setting of said first governor means, second governor means responsive to the speed of the load turbine and having a drooping speed characteristic so as to furnish a speed error output signal which is proportional to the difference between actual load turbine speed and a second speed setting on said second governor means, said speed error output signal serving to adjust the supply of fuel to the combustion system and to simultaneously change the first speed setting on said first governor means, and, third means responsive to an exhaust temperature condition of the powerplant for limiting the supply of fuel called for by the output signal of said second governor means without affecting said first speed setting.

9. In a control system for a multi-fuel gas turbine powerplant having a compressor-combustor-turbine unit and a load turbine unit, the compressor turbine rotor discharging the motive fluid through an adjustable nozzle to the load output turbine, said rotors being mechanically independent, the combination of:

first fuel supply means arranged to supply selectively either or both of two fuels having different characteristics to the combustion system, second means responsive to the speed of the compressor-turbine rotor for varying the adjustable nozzle in accordance with a speed setting, third means responsive to the speed of the load turbine for changing the speed setting of said second means, and, fourth means responsive to an exhaust turbine condition for adjusting said first fuel supply means to hold the turbine exhaust temperature substantially constant while changing from the first fuel to the second fuel, whereby the third means controls the speed of the compressor-turbine rotor during fuel changeover at constant exhaust temperature by regulating said second means.

10. In a control system for a gas turbine powerplant having a compressor-combustor-turbine unit and a load output turbine unit with a rotor mechanically independent of the compressor-turbine rotor, said rotors being in series flow relation with an adjustable nozzle therebetween, the combination of:

first electric governor means including a stabilizing circuit to provide a drooping speed characteristic and providing a first speed error output signal proportional to the difference between actual compressor-turbine rotor speed and a first adjustable speed setting, nozzle regulating means comprising a hydraulic servomechanism controlled by said first governor means output for varying the adjustable nozzle, second electric governor means having a stabilizing circuit to provide a drooping speed characteristic and providing a second speed error output signal which is proportional to the difference between actual speed of the load turbine rotor and a second adjustable speed settting, fuel regulating means comprising a hydraulic servomechanism constructed and arranged to adjust the supply of fuel to the combustion system, exhaust temperature limiting means responsive to an exhaust temperature condition and limiting the supply of fuel furnished by said fuel regulating means to limit the powerplant exhaust temperature to a preselected maximum value, said second electric governor means having its output connected to adjust said fuel regulating means when said exhaust temperature limiting means is not limiting the fuel supply and to simultaneously change the first speed setting on the first electric governor means.

11. In a control system for a gas turbine powerplant having a combustion system, a compressor-turbine rotor and a load-turbine rotor, the compressor-turbine rotor discharging motive fluid through a variable nozzle to the load-turbine rotor, said rotors being mechanically independent, the combination of:

first governor means connected to regulate the variable nozzle to hold compressor-turbine rotor speed constant at a first selected value, and, second governor means connected to regulate the supply of fuel to the combustion system to hold power output from the load-turbine rotor constant, said second governor means also being connected to alter the selected speed setting of the first governor means in accordance with changes in load-turbine rotor speed irrespective of changes in fuel supply rate.

12. In a control system for a gas turbine powerplant having a combustion system, a compressor-turbine rotor and a load-turbine rotor, the compressor-turbine rotor discharging motive fluid through a variable nozzle to the load-turbine rotor, said rotors being mechanically independent, the combination of:

first governor means connected to regulate the variable nozzle to hold compressor-turbine rotor speed constant at a first selected value, second governor means connected to regulate the supply of fuel to the combustion system to hold power output from the load-turbine rotor constant at a second preselected value, and third governor means connected to limit the supply of fuel to the combustion system to limit exhaust temperature of the motive fluid to a third preselected value, said second governor means being also connected to alter said first selected speed value in accordance with changes in load-turbine rotor speed and irrespective of changes in fuel supply effected by said third governor means.

References Cited by the Examiner

UNITED STATES PATENTS

| | | | |
|---|---|---|---|
| 2,432,177 | 12/47 | Sedille | 60—39.16 |
| 2,625,789 | 1/53 | Starkey | 60—39.25 |
| 2,632,294 | 3/53 | Wall | 60—35.6 |
| 2,912,824 | 11/59 | Van Nest et al. | 60—39.25 |

References Cited by the Applicant

UNITED STATES PATENTS 2,912,824  11/59  Van Nest.

SAMUEL LEVINE, *Primary Examiner.*

ABRAM BLUM, *Examiner.*